United States Patent [19]

Andrews, III

[11] 3,827,678

[45] Aug. 6, 1974

[54] ADDITIVE METERING APPARATUS FOR PLASTIC PROCESSING MACHINE

[76] Inventor: Charles Lee Andrews, III, 606 Whittington Pl., Statesville, N.C. 28677

[22] Filed: Nov. 27, 1972

[21] Appl. No.: 309,950

[52] U.S. Cl. .................................. 259/191, 259/25
[51] Int. Cl. .............................................. B01f 7/08
[58] Field of Search ......... 259/191, 192, 193, 9, 10, 259/25, 26, 68, 69; 425/208, 207

[56] References Cited
UNITED STATES PATENTS

| | | | |
|---|---|---|---|
| 2,604,659 | 7/1952 | Eppler | 259/191 |
| 2,896,556 | 7/1959 | Sippel | 259/191 |
| 3,291,883 | 12/1966 | Cornelius | 259/9 |
| 3,331,101 | 7/1967 | Thomas | 259/191 |
| 3,477,698 | 11/1969 | Smith | 259/25 |
| 3,645,505 | 2/1972 | Thoreson | 259/6 |

*Primary Examiner*—Robert W. Jenkins
*Attorney, Agent, or Firm*—Parrott, Bell, Seltzer, Park & Gibson

[57] ABSTRACT

An apparatus for metering and mixing dry particulate additive with a dry particulate plastic material prior to heating the mixture and molding or injecting the same to form a finished article. The apparatus includes a vertically disposed feed throat tube through which the plastic material is adapted to be fed downwardly into the processing machine. A horizontally directed tubular member extends into the feed throat tube for delivering the additive, the tubular member including vertically aligned upper and lower openings and an open forward end positioned within the feed throat tube. By this arrangement, a portion of the plastic material enters the tubular member through the upper opening and is mixed with the additive therein, and the mixture falls through the lower opening and the open forward end of the tubular member.

8 Claims, 4 Drawing Figures

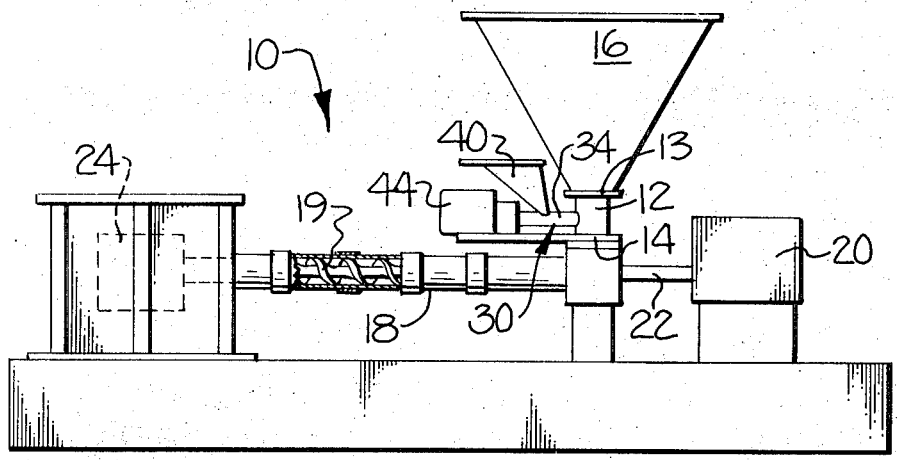
*Fig-1*
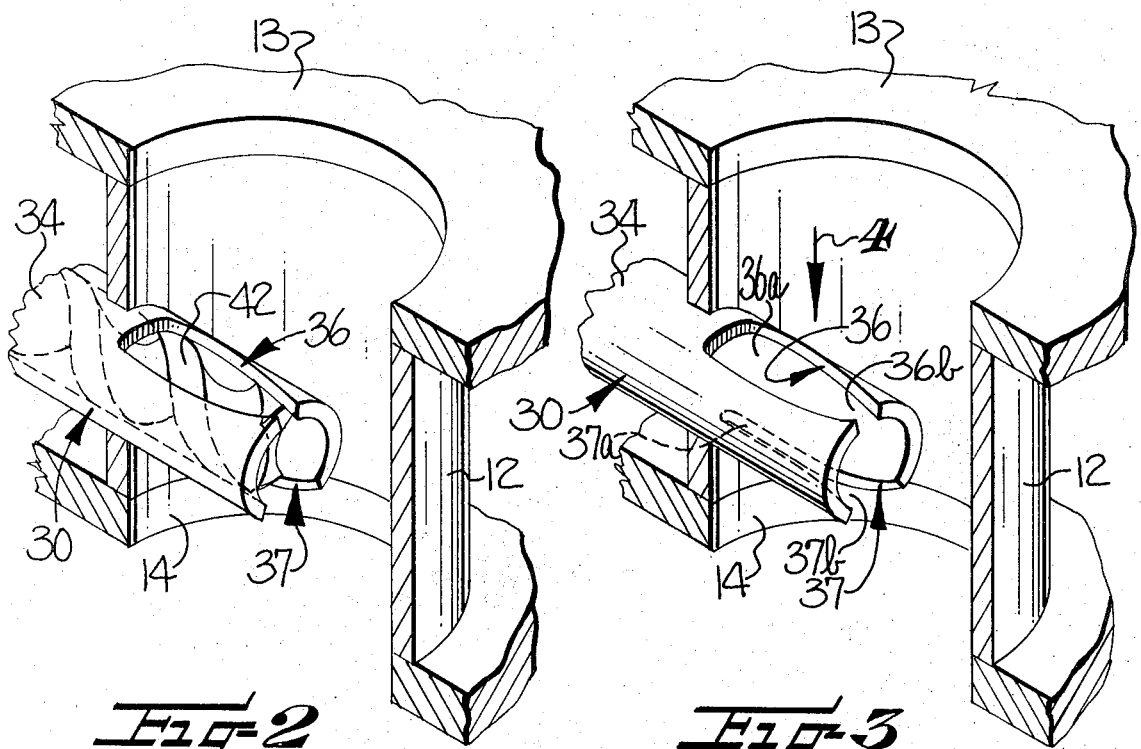
*Fig-2*  *Fig-3*
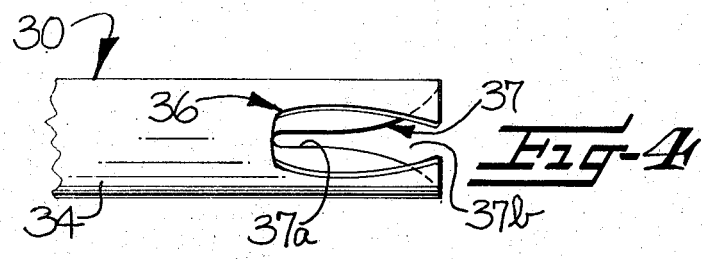
*Fig-4*

ADDITIVE METERING APPARATUS FOR PLASTIC PROCESSING MACHINE

The present invention relates to an additive metering apparatus for a plastic processing machine, such as an injection molding machine, extruder, or the like.

In plastic processing machines of the described type, it is common practice to pre-mix various additives, such as a powdered colorant, ultraviolet absorber, stabilizer, or the like, with the particulate plastic material prior to the molding operation. Such pre-mixing is often unsatisfactory however, since it is difficult to tell with certainty whether the amount of the additive being introduced will produce the desired effect in the finished product. Thus for example, where a specific color is desired in a molded article, there is no way to check on the effectiveness of the amount of colorant being introduced into the plastic material until the molding operation is commenced and a molded product is produced. Usually, such production does not start until after the pre-mixing is completed, and thus any correction in the amount of additive introduced requires a duplication of the pre-mixing operation.

To remedy the above difficulties associated with pre-mixing, it has been proposed to introduce the additive into the plastic material in the feed throat tube of the molding apparatus and just prior to entering the heated barrel of the apparatus. Thus the mixing of the various materials occurs essentially within the barrel and while the materials are being melted. It has been found however that such limited mixing is often insufficient to obtain a uniform finished product.

It is accordingly an object of the present invention to provide an apparatus for continuously metering a dry additive into a moving stream of dry particulate plastic material while concurrently mixing the additive with the plastic material.

It is another object of the present invention to provide an additive metering and mixing apparatus in association with a plastic processing machine such as an injection molding apparatus, and which is designed to provide a thorough mixing of the ingredients prior to the ingredients entering the heated barrel of the machine, and without the pre-mixing required heretofore.

It is a more specific object of the present invention to provide an additive mixing and metering apparatus of the described type wherein a portion of the plastic material is co-mingled and mixed with the additive within the additive delivery tube such that mixed additive and plastic material is introduced into the moving stream of the plastic material rather than pure additive.

These and other objects and advantages of the present invention are achieved in the embodiment illustrated herein by the provision of an apparatus which includes a vertically directed feed throat tube, and a hopper for directing a dry particulate plastic material downwardly into the feed throat tube. A tubular member extends horizontally into the feed throat tube for introducing the additive, the tubular member including an upwardly facing inlet opening and outlet opening means positioned with the feed throat tube. As the additive is conveyed through the tubular member and into the feed throat tube, a portion of the plastic material enters the tubular member through the inlet opening and is mixed therein with the additive. The mixture of the additive and plastic material in the tubular member is then delivered into the feed throat tube through the outlet opening means.

Some of the objects of the invention having been stated, other objects will appear as the description proceeds, when taken in connection with the accompanying drawings, in which FIG. 1 is a schematic representation of a plastic injection molding apparatus embodying the features of the present invention;

FIG. 2 is a fragmentary sectional isometric view of the interior of the feed throat tube and showing the terminal end portion of the tubular member for delivering the additive;

FIG. 3 is a view similar to FIG. 2, but with the feed auger in the tubular member deleted for purposes of illustrating the downwardly facing outlet opening in the tubular member;

FIG. 4 is a fragmentary top plan view of the terminal end portion of the tubular member and taken in the direction of arrow 4 in FIG. 3.

Referring more specifically to the drawings, the present invention is illustrated in association with a plastic injection molding apparatus which is indicated generally at 10 in FIG. 1. As will become apparent however, the present invention is equally applicable for use with other plastic processing machines, such as an extruder or blow molding apparatus. The molding apparatus 10 includes a feed throat tube 12 defining an upper entry end 13 and a lower discharge end 14. A hopper 16 is mounted above the tube 12 and in communication with the upper end 13, the hopper 16 being adapted to receive a relatively large quantity of dry particulate plastic material therein such that the plastic material flows downwardly into and through the tube 12 by gravity.

The lower discharge end 14 of the feed throat tube 12 communicates with the injection barrel 18 of the molding apparatus, and as is conventional, the barrel 18 is heated by suitable electrical means (not shown) and houses a relatively large reciprocating injection screw 19. The screw 19 is adapted to be cyclically rotated and reciprocated by the conventional drive apparatus indicated generally at 20 acting through the shaft 22. A mold cavity 24 communicates with the discharge end of the barrel 18 and is designed to cyclically receive a charge of the melted plastic to form a finished molded plastic article.

During operation of the injection molding apparatus 10, the plastic material enters the rear end of the barrel from the feed throat tube 12 and is heated and melted therein. During the injection cycle, the screw 19 is shifted axially forwardly toward the left as seen in FIG. 1 to inject the melted plastic into the mold cavity 24. During axial movement of the screw toward the right, the screw is rotated to cause forward movement of the plastic relative to the screw.

The additive metering and mixing apparatus of the present invention includes a tubular member 30 extending horizontally into said feed throat tube 12 and defining a terminal end portion 32 positioned within the feed throat tube, and a rear end portion 34 positioned within the feed throat tube. As best seen in FIG. 3, the terminal end portion 32 includes an upwardly facing inlet opening 36, a downwardly facing outlet opening 37 and an open forward end 38. The upwardly facing inlet opening extends longitudinally along a substantial portion of the length of the terminal end portion, and the downwardly facing outlet opening 37 is substantially coextensive with the inlet opening 36 in the longitudinal direction.

An additive hopper 40 is operatively connected to the rear end portion 34 of the tubular member 30 for directing the additive into the bore of the tubular member. Also, a feed auger 42 is positioned coaxially within the bore of the tubular member 30, and a variable speed electric motor 44 is designed to rotate the auger at a selected speed to thereby convey the additive axially therealong and into the feed throat tube 12 at a controlled rate.

The inlet opening 36 of the tubular member 30 has a generally teardrop outline as seen in FIG. 4, and defines a relatively large opening portion 36a spaced from the open forward end 38, and a relatively small opening portion 36b communicating with the open end 38. The outlet opening 37 comprises a relatively narrow slot portion 37a underlying the large opening portion 36a of the inlet opening and outwardly flared side edges communicating with the open end 38 to define a widened opening portion 37b.

The specific design of the inlet and outlet openings depends somewhat on the nature of the plastic material flowing downwardly through the feed throat tube 12, as well as the nature of the additive. For example, the illustrated relatively narrow slot portion 37a of the outlet opening 37 is designed to permit a relatively small quantity of a powered additive to drop therethrough as the additive is being conveyed along the tubular member 30 by the auger 42. The removal of the additive thus provides room for a pelletized plastic material to enter the bore of the tubular member through the relatively large opening portion 36a, and the narrow slot portion 37a of the outlet opening is designed to preclude the pelletized plastic material from dropping therethrough. Thus the materials are mixed as they are advanced along the tubular member 30, and as the mixture reaches the widened opening portion 37b and the open forward end 38, it drops into the feed throat tube 12. By this arrangement, it will be apparent that essentially all of the additive is mixed with a portion of the plastic material within the tubular member and prior to being introduced into the feed throat tube 12. This mixing of the additive and plastic material in the tubular member 30 has been found to greatly facilitate the subsequent further mixing of the two materials in the barrel 18 to thereby insure a uniform finished product.

In operation, a dry particulate plastic material, in either powdered, granular, or pelletized form is positioned within the hopper 16 such that the plastic material flows downwardly through the feed throat tube 12 and into the barrel 18 of the molding apparatus. Conventionally the plastic material is a natural, uncolored thermoplastic material, and may comprise for example any of the polyolefins or their copolymers.

A dry particulate additive, which also may be in either powdered, granular, or pelletized form is positioned in the additive hopper 40. Typically, the additive comprises a concentrated colorant in powdered or pellet form, and it may be pre-blended with other additives such as an ultraviolet absorbent, a blowing agent, or a stabilizer.

During the molding operation, the drive apparatus 20 operates to rotate and reciprocate the screw 19 within the barrel 18 to cyclically convey the heated plastic material along the barrel 18, while the variable speed motor 44 acts to rotate the auger 42 and thereby convey the additive through the tubular member 30 while mixing the same with the plastic material which enters through the inlet opening 36. The mixture is then introduced into the feed throat tube 12 in the manner described above. The auger 42 is normally rotated at a constant speed which is coordinated to the volume of plastic material passing through the feed throat tube 12. Since the speed of the motor 44 is variable, the amount of the additive being introduced into the plastic material may be easily adjusted during the molding operation to insure the desired results.

In the drawings and specification, there has been set forth a preferred embodiment of the invention, and although specific terms are employed, they are used in a generic and descriptive sense only and not for purposes of limitation.

That which is claimed is:

1. An apparatus for continuously metering and mixing a dry particulate additive with a dry particulate plastic material such that the mixture may be continuously supplied to a plastic processing machine, such as an injection molding machine, extruder, or the like, and comprising
   a vertically directed feed throat tube,
   hopper means operatively connected to said feed throat tube for directing dry particulate plastic material downwardly therethrough,
   a tubular member extending horizontally into said feed throat tube and defining a terminal end portion positioned within said feed throat tube, said terminal end portion including an upwardly facing inlet opening and outlet opening means, and
   means for conveying a dry particulate additive axially through said tubular member whereby a portion of the plastic material flowing downwardly through said feed throat tube enters said terminal end portion through said inlet opening and is co-mingled with the additive, and the co-mingled additive and plastic material in said terminal end portion is delivered into said feed throat tube through said outlet opening means.

2. The apparatus as defined in claim 1 wherein said outlet opening means defines a downwardly facing outlet opening and an open forward end, whereby a portion of the co-mingled additive and plastic material in said terminal end portion drops into said feed throat tube through said downwardly facing outlet opening and the remainder of the co-mingled additive and plastic material in said terminal end portion is delivered into said feed throat tube through said open forward end.

3. The apparatus as defined in claim 2 wherein said upwardly facing inlet opening extends longitudinally along a substantial portion of the length of said terminal end portion, and said downwardly facing outlet opening is substantially coextensive with said upwardly facing inlet opening in the longitudinal direction.

4. The apparatus as defined in claim 3 wherein both said upwardly facing inlet opening and said downwardly facing outlet opening communicate with said open forward end.

5. The apparatus as defined in claim 2 wherein said upwardly facing inlet opening has a generally teardrop outline extending longitudinally along a substantial portion of the length of said terminal end portion and defining a relatively large opening portion spaced from said open forward end and a relatively small opening portion adjacent said open forward end.

6. The apparatus as defined in claim 5 wherein said downwardly facing outlet opening comprises a relatively narrow slot portion spaced from said open forward end and underlying said relatively large portion of said inlet opening, and a widened opening portion communicating with said open forward end.

7. The apparatus as defined in claim 1 wherein said conveying means includes a feed auger positioned coaxially within said tubular member, and a variable speed drive motor operatively connected to said feed auger whereby the auger may be rotated to convey the additive and plastic material through the tubular member while mixing the same and the speed of rotation of said auger may be selectively controlled to thereby control the rate of delivery of the additive through said tubular member.

8. The apparatus as defined in claim 7 wherein said tubular member further includes a rear end portion positioned outside said feed throat tube, and said apparatus further comprises additive hopper means operatively connected to said rear end portion of said tubular member for directing the additive into said tubular member.

* * * * *

UNITED STATES PATENT OFFICE
CERTIFICATE OF CORRECTION

Patent No. 3,827,678    Dated August 6, 1974

Inventor(s) Charles Lee Andrews, III

It is certified that error appears in the above-identified patent and that said Letters Patent are hereby corrected as shown below:

Column 2, line 63, "within" should be --outside--.

Signed and sealed this 3rd day of December 1974.

(SEAL)
Attest:

McCOY M. GIBSON JR.
Attesting Officer

C. MARSHALL DANN
Commissioner of Patents